United States Patent
Chou et al.

(10) Patent No.: US 10,975,202 B2
(45) Date of Patent: Apr. 13, 2021

(54) POLY(AMIDE-IMIDE) AND METHOD OF PREPARING THE SAME

(71) Applicant: Taiwan Textile Research Institute, New Taipei (TW)

(72) Inventors: Shang-Chih Chou, New Taipei (TW); Shao-Yen Chang, New Taipei (TW); Chun-Hung Lin, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 48 days.

(21) Appl. No.: 16/283,832

(22) Filed: Feb. 25, 2019

(65) Prior Publication Data

US 2020/0055988 A1 Feb. 20, 2020

(30) Foreign Application Priority Data

Aug. 20, 2018 (TW) ................................ 107129002

(51) Int. Cl.
*C08G 73/14* (2006.01)
(52) U.S. Cl.
CPC .................................... *C08G 73/14* (2013.01)
(58) Field of Classification Search
CPC ........... C08L 79/08; C08L 2666/20–36; C08G 73/10–14
See application file for complete search history.

(56) References Cited

U.S. PATENT DOCUMENTS

| | | | |
|---|---|---|---|
| 4,293,684 A * | 10/1981 | Takekoshi | C08G 73/1071 528/125 |
| 4,981,497 A | 1/1991 | Hayes | |
| 9,255,181 B2 | 2/2016 | Gallucci et al. | |
| 2007/0224422 A1 | 9/2007 | Fakhreddine et al. | |
| 2010/0048853 A1 | 2/2010 | Dris et al. | |
| 2010/0133192 A1 | 6/2010 | Liu et al. | |
| 2012/0015184 A1 | 1/2012 | Endo et al. | |
| 2014/0213739 A1 * | 7/2014 | Gallucci | D01D 5/08 525/434 |

FOREIGN PATENT DOCUMENTS

| | | |
|---|---|---|
| CN | 1232686 | 12/2005 |
| CN | 101338462 | 9/2010 |
| CN | 103930468 | 8/2016 |
| CN | 107261870 | 10/2017 |
| DE | 2829811 | 1/1980 |
| JP | 2016023285 | 2/2016 |
| TW | 200833783 | 8/2008 |

OTHER PUBLICATIONS

"Office Action of Taiwan Counterpart Application," dated Dec. 30, 2019, p. 1-p. 3.

* cited by examiner

*Primary Examiner* — Ana L. Woodward
(74) *Attorney, Agent, or Firm* — JCIPRNET (57) ABSTRACT

A poly(amide-imide) is provided. The poly(amide-imide) is represented by formula (1),

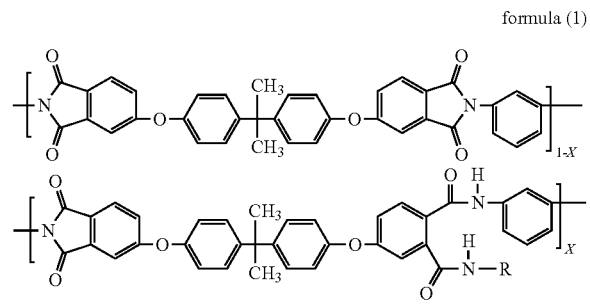

wherein R is a $C_6$ aryl group, a $C_7$-$C_8$ aralkyl group, a $C_2$-$C_6$ alkoxyalkyl group, or a $C_3$-$C_{18}$ alkyl group; and $0.02 \leq X \leq 0.5$.

9 Claims, 1 Drawing Sheet

POLY(AMIDE-IMIDE) AND METHOD OF PREPARING THE SAME

CROSS-REFERENCE TO RELATED APPLICATION

This application claims the priority benefit of Taiwan application serial no. 107129002, filed on Aug. 20, 2018. The entirety of the above-mentioned patent application is hereby incorporated by reference herein and made a part of this specification.

BACKGROUND

1. Field of the Invention

This disclosure is related to a polymer, and in particular to a poly(amide-imide) and a preparation method thereof.

2. Description of Related Art

Many thermoplastic resins called "engineering plastics" have been widely used in various fields due to their excellent heat resistance, chemical resistance, flame retardance and the like. However, there are still limitations in the use of engineering plastics. For example, the processing temperature of polyetherimide is quite high (between 350° C. and 380° C.), which is not easy to achieve for a general machine. Further, when polyvinylidenefluoride is subjected to high-temperature molding, if the processing temperature is 320° C. or more, hydrofluoric acid having strong corrosive properties is likely to be generated. Therefore, how to improve the applicability of engineering plastics is still an important topic for active research at present.

SUMMARY

The present invention provides a poly(amide-imide) having a good melt processability by reduced melt processing temperature, and a process for preparing the same.

In this invention, the poly(amide-imide) is represented by formula (1) below.

formula (b)

formula (c)

formula (d)

formula (e)

formula (f)

formula (g)

and * represents a bonding position in formula (a) to formula (g).

formula (1)

In formula (1), R is a $C_6$ aryl group, a $C_7$-$C_8$ aralkyl group, a $C_2$-$C_6$ alkoxyalkyl group, or a $C_3$-$C_{18}$ alkyl group, and $0.02 \leq X \leq 0.5$.

In some embodiments of this invention, R is selected from the functional groups represented by formula (a) to formula (g) shown below, formula (a)

In some embodiments of this invention, the weight-average molecular weight of the poly(amide-imide) is between 47,000 g/mol and 55,000 g/mol.

In this invention, a preparation method of a poly(amide-imide) comprises the following steps. A first solution containing a poly(amide-imide) is formed by reacting a modifier with a polyimide dissolved in a solvent. The poly(amide-imide) is precipitated from the first solution by adding a non-solvent into the first solution containing the poly(amide-imide). The polyimide comprises a repeat unit represented by formula (I). The modifier is represented by formula (II). The poly(amide-imide) is represented by formula (1).

formula (I)

NH$_2$R formula (II)

formula (1)

The weight-average molecular weight of the polyimide is between 44,000 g/mol and 50,000 g/mol. In formula (1), R is a C$_6$ aryl group, a C$_7$-C$_8$ aralkyl group, a C$_2$-C$_6$ alkoxyalkyl group, or a C$_3$-C$_{18}$ alkyl group, and $0.02 \leq X \leq 0.5$.

In some embodiments of this invention, R is selected from the functional groups represented by formula (a) to formula (g) shown below, formula (a)

formula (b)

formula (c)

formula (d)

formula (e)

formula (f)

formula (g)

and * represents a bonding position in formula (a) to formula (g).

In some embodiments of this invention, the weight-average molecular weight of the poly(amide-imide) is between 47,000 g/mol and 55,000 g/mol.

In some embodiments of this invention, the solvent comprises N,N-dimethylacetamide (DMAc), N-methyl-2-pyrrolidone (NMP) or tetrahydrofuran (THF).

In some embodiments of this invention, the non-solvent comprises methanol, ethanol, isopropanol, or water.

In some embodiments of this invention, the method further comprises using a diluent to dilute the first solution containing the poly(amide-imide) to form a second solution containing the poly(amide-imide) before adding the non-solvent to the first solution containing the poly(amide-imide).

In some embodiments of this invention, a viscosity of the first solution containing the poly(amide-imide) is between 1,000 cps and 10,000 cps, and a viscosity of the second solution containing the poly(amide-imide) is between 10 cps and 200 cps.

In some embodiments of this invention, a ratio of the weight-average molecular weight of the poly(amide-imide) and the weight-average molecular weight of the polyimide is between 2.2 and 2.6.

In some embodiments of this invention, a reaction temperature of a reaction between the polyimide and the modifier is between 30° C. and 100° C.

Based on the above, the method of preparing the poly(amide-imide) of the present invention comprises the following steps. The modifier represented by the above formula (II) is reacted with the polyimide represented by the above formula (I) to form a solution containing a poly(amide-imide), and then a non-solvent is added to the solution. Thereby, the poly(amide-imide) represented by the above formula (1) can be obtained. Further, based on the structure shown in formula (1), it is understood that the poly(amide-imide) of the present invention has a ring-opening structure to increase the free volume of molecules, whereby the poly(amide-imide) has good melt processability by reduced melt processing temperature.

The above described features and advantages of the present invention will be more apparent from the following description.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

In the present specification, skeleton formulas are sometimes used to represent the structures of polymers or groups. Such representation can omit carbon atoms, hydrogen atoms, and carbon-hydrogen bonds. Of course, structural formulas with clear illustrations of atoms or atomic groups are definitive.

As used herein, "about," "approximate," "essentially," or "substantially" includes the values and average values within acceptable deviations of the particular values determined by those of ordinary skill in the art, and considers the specific amount of measurement and error associated with the measurement (i.e., the limitations of the measurement system). For example, "about" can mean within one or more standard deviations of the value, or within ±30%, ±20%, ±15%, ±10%, ±5%, for example. Furthermore, the terms "about", "approximate", "essentially", or "substantially" used herein may select a more acceptable range or standard deviation depending on the nature of the measurement or other properties, but all properties can be applied without specifying a standard deviation.

In order to provide a poly(amide-imide) with good melt processability by reduced melt processing temperature, the present invention provides a method for preparing a poly (amide-imide). The obtained poly(amide-imide) can attain the above advantage. Hereinafter, the specific embodiments are described as examples to illustrate that the present invention can be implemented.

Figure 1:
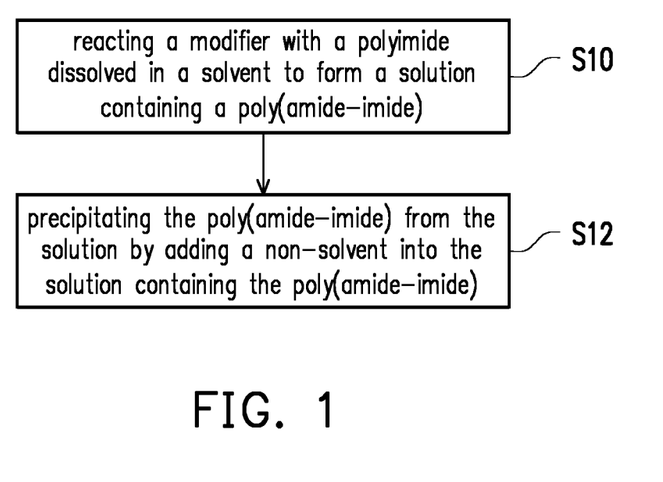
FIG. 1 is a schematic flow chart of a method for preparing a poly(amide-imide) according to an embodiment of the present invention.

FIG. 1 is a schematic flow chart of a method for preparing a poly(amide-imide) according to an embodiment of the present invention. Referring to FIG. 1, first, in step S10, a modifier is reacted with a polyimide dissolved in a solvent to form a solution containing the poly(amide-imide). That is, in the present embodiment, the poly(amide-imide) is obtained by modifying the polyimide with the modifier.

In this embodiment, the polyimide comprises a repeat unit represented by formula (I) of That is, in the present embodiment, the dianhydride monomer used to manufacture the polyimide includes 4,4'-(4,4'-isopropylidenediphenoxy)bis(phthalic anhydride) (BPADA), and the diamine monomer used to manufacture the polyimide includes m-phenylenediamine (m-PDA). In the present embodiment, the polyimide may be a commercially available product or a recycled polyimide powder (i.e., a secondary material), wherein the commercial product is, for example, ULTEM 9011 spinning grade PEI and ULTEM 1010 PEI manufactured by Sabic Industries. In this embodiment, the weight-average molecular weight of the polyimide is between about 44,000 g/mol and about 50,000 g/mol.

The solvent is not particularly limited as long as it can dissolve the aforementioned polyimide. In this embodiment,
the solvent may include N,N-dimethylacetamide (DMAc), N-methyl-2-pyrrolidone (NMP), or tetrahydrofuran (THF). Further, in the present embodiment, a concentration of the aforementioned polyimide in the solvent may be between about 5 wt % and about 40 wt %.

In this embodiment, the modifier may be represented by formula (II) of $NH_2R$. In formula (II), R may be a $C_6$ aryl group, a $C_7$-$C_8$ aralkyl group, a $C_2$-$C_6$ alkoxyalkyl group, or a $C_3$-$C_{18}$ alkyl group. In this embodiment, R may be selected from the functional groups represented by formula (a) to formula (g) shown below, formula (a)

formula (b)

formula (c)

formula (d)

formula (e)

formula (f)

-continued formula (g)

and in formula (a) to formula (g), * represents a bonding position thereof. That is, in the present embodiment, the modifier may be aniline, phenylmethylamine, phenethylamine, 3-isopropoxypropylamine (IPOPA), isopropylamine, n-butylamine, or octadecylamine. From another point of view, in the present embodiment, the modifier may be a small molecule amine which is liquid at room temperature and under normal pressure.

In this embodiment, the poly(amide-imide) is represented by formula (1) of

In formula (1), the definition of R is the same as the definition of R in formula (II) above, and $0.02 \leq X \leq 0.5$. According to the structure shown in formula (1), in this embodiment, the modifier is reacted with the imide group of the polyimide to open the imide group ring of the polyimide. That is, in the present embodiment, the poly(amide-imide) represented by formula (1) is a side-chain modified poly (amide-imide). In this embodiment, in the reaction of the polyimide and the modifier, the reaction temperature is between about 30° C. and about 100° C., and the reaction time is between about 4 hours and about 8 hours.

In this embodiment, a weight-average molecular weight of the poly(amide-imide) is between about 47,000 g/mol and about 55,000 g/mol. Moreover, in this embodiment, the ratio of the weight-average molecular weight of the poly(amide-imide) to the weight-average molecular weight of the polyimide is between about 2.2 and about 2.6. In this embodiment, the solution containing the aforementioned poly (amide-imide) has a viscosity of between about 1,000 cps and about 10,000 cps.

Next, referring to FIG. 1, in step S12, a non-solvent is added to the solution containing the poly(amide-imide) to precipitate the poly(amide-imide) from the solution. In detail, after the non-solvent is added to the solution containing the poly(amide-imide), the solvent of the poly (amide-imide) solution will be replaced by the non-solvent to precipitate solids of the poly(amide-imide). In this embodiment, the non-solvent may include methanol, ethanol, isopropanol or water. In this embodiment, the poly (amide-imide) precipitated from the solution is in the form of a solid powder.

After performing the above steps S10 to S12, the poly (amide-imide) provided in one embodiment of this invention may be prepared. In this embodiment, the poly(amide-imide) is represented by formula (1) shown in the foregoing, wherein the definitions of R and X have been described in detail above, and thus will not be described herein again. In addition, the related description of the poly(amide-imide) has been described in detail in the foregoing, and thus will not be described herein again.

It is to be noted that, in this embodiment, the modifier represented by the above formula (II) and the polyimide represented by the above formula (I) are reacted to form a solution containing the poly(amide-imide), and the non-solvent is then added to the solution, whereby the poly (amide-imide) represented by the above formula (1) can be obtained. Further, based on the structure shown in formula (1), it is known that due to the ring-opening structure (i.e. a sidechain modified by the modifier), the free volume of molecules of the poly(amide-imide) is increased, and thus the poly(amide-imide) may have good melt processability by reduced melt processing temperatures.

Further, in the embodiment shown in FIG. 1, the poly (amide-imide) is prepared by performing steps S10 to S12, but this invention is not limited thereto. Hereinafter, other embodiments will be described with reference to FIG. 2. It is to be noted that the following embodiments have used the same or similar elements, and the same or similar elements are denoted the same or similar numerals, and the description of the same technical content is omitted. For the description of the omitted portions, reference may be made to the foregoing embodiments, and is not repeated in the following embodiments.

Figure 2:
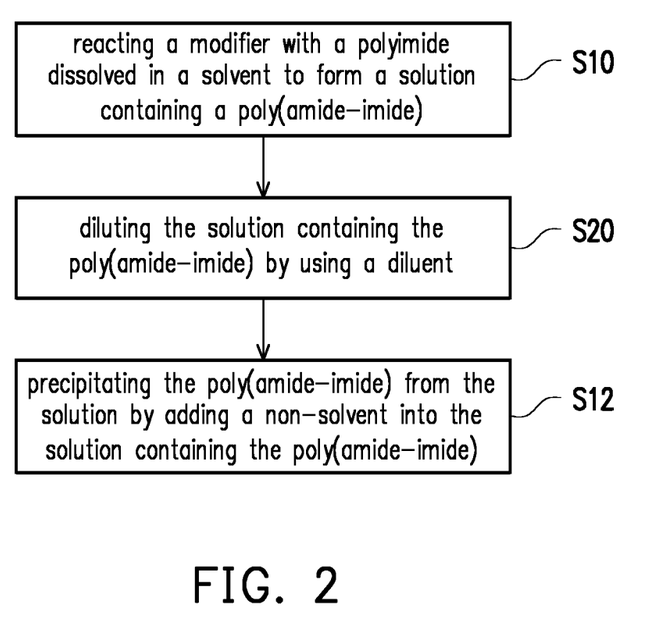
FIG. 2 is a schematic flow chart of a method for preparing a poly(amide-imide) according to another embodiment of the present invention.

FIG. 2 is a schematic flow chart of a method for preparing a poly(amide-imide) according to another embodiment of this invention. Referring to FIG. 2 and FIG. 1 simultaneously, the preparation method shown in FIG. 2 is similar to the preparation method shown in FIG. 1, and therefore the same or similar steps are denoted by the same or similar numerals, and the description of the same technical contents is thus omitted. For the description of the omitted portions, reference may be made to the foregoing embodiments. Hereinafter, the difference between the preparation method shown in FIG. 2 and the preparation method shown in FIG. 1 will be explained.

Referring to FIG. 2, before the step S12, the preparation method of this embodiment includes performing the step S20 to dilute the solution containing the poly(amide-imide) represented by the above formula (1) with a diluent to form a diluted solution containing the foregoing poly(amide-imide).

The diluent is not particularly limited as long as it can dissolve the aforementioned poly(amide-imide). In this embodiment, the diluent may include N,N-dimethylacetamide (DMAc), N-methyl-2-pyrrolidone (NMP), or tetrahydrofuran (THF).

In this embodiment, a viscosity of the solution containing the poly(amide-imide) before dilution is between about 1,000 cps and about 10,000 cps, and a viscosity of the diluted solution containing the poly(amide-imide) is about 10 cps to about 200 cps.

Features of this invention will be more specifically described below with reference to Examples 1-14 and Comparative Example 1. Although the following examples are described, the materials used, their amounts and ratios, processing details, processing flows, and the like can be appropriately changed without departing from the scope of the invention. Therefore, the invention should not be construed restrictively by the examples described below.

Example 1

First, 100 parts by weight of polyimide (manufactured by Sabic, trade name: ULTEM 1010 PEI) was dissolved in a solvent DMAc to form a 25 wt % polyimide solution. Next, 5 parts by weight of a modifier aniline was added to the polyimide solution, and the reaction of the modifier aniline and the polyimide was carried out at 80° C. for 6 hours to form a solution containing the poly(amide-imide) of Example 1, wherein a molar ratio of the polyimide and the modifier aniline was 1:25.7, and the solution containing the poly(amide-imide) of Example 1 had a viscosity of about 10,000 cps. Subsequently, the solution containing the poly (amide-imide) of Example 1 was diluted with a diluent DMAc to form a diluted solution containing the poly(amide-imide) of Example 1 and having a viscosity of about 100 cps. Next, 2 liters (or an excess amount) of non-solvent methanol was added to the diluted solution to precipitate the poly (amide-imide) of Example 1. It is worth noting that the precipitated poly(amide-imide) of Example 1 was subjected to filtering and drying steps for subsequent use.

Example 2

First, 100 parts by weight of polyimide (manufactured by Sabic, trade name: ULTEM 1010 PEI) was dissolved in a solvent DMAc to form a 25 wt % polyimide solution. Next, 1.5 parts by weight of a modifier phenylmethylamine was added to the polyimide solution, and the reaction of the modifier phenylmethylamine and the polyimide was carried out at 80° C. for 6 hours to form a solution containing the poly(amide-imide) of Example 2, wherein the molar ratio of the polyimide to the modifier phenylmethylamine was 1:6.7, and a viscosity of the solution containing the poly(amide-imide) of Example 2 was about 7,300 cps. Subsequently, the solution containing the poly(amide-imide) of Example 2 was diluted with a diluent DMAc to form a diluted solution containing the poly(amide-imide) of Example 2 and having a viscosity of about 100 cps. Thereafter, 2 liters (or an excess amount) of non-solvent methanol was added to the diluted solution to precipitate the poly(amide-imide) of Example 2. It is worth noting that the precipitated poly(amide-imide) of Example 2 is subjected to filtering and drying steps for subsequent use.

Example 3

First, 100 parts by weight of polyimide (manufactured by Sabic, trade name: ULTEM 1010 PEI) was dissolved in a solvent DMAc to form a 25 wt % polyimide solution. Next, 2 parts by weight of a modifier phenylmethylamine was added to the polyimide solution, and the reaction of the modifier phenylmethylamine and the polyimide was carried out at 80° C. for 6 hours to form a solution containing the poly(amide-imide) of Example 3, wherein the molar ratio of the polyimide to the modifier phenylmethylamine was 1:8.9, and a viscosity of the solution containing the poly(amide-imide) of Example 3 was about 4,400 cps. Subsequently, the solution containing the poly(amide-imide) of Example 3 was diluted with a diluent DMAc to form a diluted solution containing the poly(amide-imide) of Example 3, wherein a viscosity of the diluted solution was about 100 cps. Thereafter, 2 liters (or an excess amount) of non-solvent methanol was added to the diluted solution to precipitate the poly (amide-imide) of Example 3. It is worth noting that the precipitated poly(amide-imide) of Example 3 is subjected to filtering and drying steps for subsequent use.

Example 4

First, 100 parts by weight of polyimide (manufactured by Sabic, trade name: ULTEM 1010 PEI) was dissolved in a solvent DMAc to form a 25 wt % polyimide solution. Next, 5 parts by weight of a modifier phenethylamine was added to the polyimide solution, and the reaction of the modifier phenethylamine and the polyimide was carried out at 80° C. for 6 hours to form a solution containing the poly(amide-imide) of Example 4, wherein the molar ratio of the polyimide to the modifier phenethylamine was 1:19.8, and a viscosity of the solution containing the poly(amide-imide) of Example 4 was about 1,000 cps. Subsequently, the solution containing the poly(amide-imide) of Example 4 was diluted with a diluent DMAc to form a diluted solution containing the poly(amide-imide) of Example 4, wherein a viscosity of the diluted solution was about 100 cps. Thereafter, 2 liters (or an excess amount) of non-solvent methanol was added to the diluted solution to precipitate the poly(amide-imide) of Example 4. It is worth noting that the precipitated poly (amide-imide) of Example 4 is subjected to filtering and drying steps for subsequent use.

Example 5

First, 100 parts by weight of polyimide (manufactured by Sabic, trade name: ULTEM 1010 PEI) was dissolved in a solvent DMAc to form a 25 wt % polyimide solution. Next, 1.1 parts by weight of a modifier 3-isopropoxypropylamine was added to the polyimide solution, and the reaction of the modifier 3-isopropoxypropylamine and the polyimide was carried out at 80° C. for 6 hours to form a solution containing the poly(amide-imide) of Example 5. The molar ratio of the polyimide and the modifier 3-isopropoxypropylamine was 1:4.5, and a viscosity of the solution containing the poly (amide-imide) of Example 5 was about 9,300 cps. Subsequently, the solution containing the poly(amide-imide) of Example 5 was diluted with a diluent DMAc to form a diluted solution containing the poly(amide-imide) of Example 5, wherein a viscosity of the diluted solution was about 100 cps. Thereafter, 2 liters (or an excess amount) of non-solvent methanol was added to the diluted solution to precipitate the poly(amide-imide) of Example 5. It is worth noting that the precipitated poly(amide-imide) of Example 5 is subjected to filtering and drying steps for subsequent use.

Example 6

First, 100 parts by weight of polyimide (manufactured by Sabic, trade name: ULTEM 1010 PEI) was dissolved in a solvent DMAc to form a 25 wt % polyimide solution. Next, 2 parts by weight of a modifier 3-isopropoxypropylamine was added to the polyimide solution, and the reaction of the modifier 3-isopropoxypropylamine and the polyimide was carried out at 80° C. for 6 hours to form a solution containing the poly(amide-imide) of Example 6. The molar ratio of the polyimide and the modifier 3-isopropoxypropylamine was 1:8.2, and a viscosity of the solution containing the poly (amide-imide) of Example 6 was about 7,800 cps. Subsequently, the solution containing the poly(amide-imide) of Example 6 was diluted with a diluent DMAc to form a diluted solution containing the poly(amide-imide) of Example 6, wherein a viscosity of the diluted solution was about 100 cps. Thereafter, 2 liters (or an excess amount) of non-solvent methanol was added to the diluted solution to precipitate the poly(amide-imide) of Example 6. It is worth noting that the precipitated poly(amide-imide) of Example 6 is subjected to filtering and drying steps for subsequent use.

Example 7

First, 100 parts by weight of polyimide (manufactured by Sabic, trade name: ULTEM 1010 PEI) was dissolved in a solvent DMAc to form a 25 wt % polyimide solution. Next, 5 parts by weight of a modifier 3-isopropoxypropylamine was added to the polyimide solution, and the reaction of the modifier 3-isopropoxypropylamine and the polyimide was carried out at 80° C. for 6 hours to form a solution containing the poly(amide-imide) of Example 7. The molar ratio of the polyimide and the modifier 3-isopropoxypropylamine was 1:20.5, and a viscosity of the solution containing the poly (amide-imide) of Example 7 was about 2,000 cps. Subsequently, the solution containing the poly(amide-imide) of Example 7 was diluted with a diluent DMAc to form a diluted solution containing the poly(amide-imide) of Example 7, wherein the viscosity of the diluted solution was about 100 cps. Thereafter, 2 liters (or an excess amount) of non-solvent methanol was added to the diluted solution to precipitate the poly(amide-imide) of Example 7. It is worth noting that the precipitated poly(amide-imide) of Example 7 is subjected to filtering and drying steps for subsequent use.

Example 8

First, 100 parts by weight of polyimide (manufactured by Sabic, trade name: ULTEM 1010 PEI) was dissolved in a solvent DMAc to form a 25 wt % polyimide solution. Next, 1.1 parts by weight of a modifier n-butylamine was added to the polyimide solution, and the reaction of the modifier n-butylamine and the polyimide was carried out at 80° C. for 6 hours to form a solution containing the poly(amide-imide) of Example 8, wherein the molar ratio of the polyimide to the modifier n-butylamine was 1:7.2, and a viscosity of the solution containing the poly(amide-imide) of Example 8 was about 8,500 cps. Subsequently, the solution containing the poly(amide-imide) of Example 8 was diluted with a diluent DMAc to form a diluted solution containing the poly(amide-imide) of Example 8, wherein a viscosity of the diluted solution was about 100 cps. Thereafter, 2 liters (or an excess amount) of non-solvent methanol was added to the diluted solution to precipitate the poly(amide-imide) of Example 8. It is worth noting that the precipitated poly(amide-imide) of Example 8 is subjected to filtering and drying steps for subsequent use.

Example 9

First, 100 parts by weight of polyimide (manufactured by Sabic, trade name: ULTEM 1010 PEI) was dissolved in a solvent DMAc to form a 25 wt % polyimide solution. Next, 2 parts by weight of a modifier n-butylamine was added to the polyimide solution, and the reaction of the modifier n-butylamine and the polyimide was carried out at 80° C. for 6 hours to form a solution containing the poly(amide-imide) of Example 9, wherein the molar ratio of the polyimide to the modifier n-butylamine was 1:13.1, and a viscosity of the solution containing the poly(amide-imide) of Example 9 was about 6900 cps. Subsequently, the solution containing the poly(amide-imide) of Example 9 was diluted with a diluent DMAc to form a diluted solution containing the poly(amide-imide) of Example 9, wherein a viscosity of the diluted solution was about 100 cps. Thereafter, 2 liters (or an excess amount) of non-solvent methanol was added to the diluted solution to precipitate the poly(amide-imide) of Example 9. It is worth noting that the precipitated poly(amide-imide) of Example 9 is subjected to filtering and drying steps for subsequent use.

Example 10

First, 100 parts by weight of polyimide (manufactured by Sabic, trade name: ULTEM 1010 PEI) was dissolved in a solvent DMAc to form a 25 wt % polyimide solution. Next, 5 parts by weight of a modifier n-butylamine was added to the polyimide solution, and the reaction of the modifier n-butylamine and the polyimide was carried out at 80° C. for 6 hours to form a solution containing the poly(amide-imide) of Example 10. The molar ratio of the polyimide to the modifier n-butylamine was 1:32.8, and a viscosity of the solution containing the poly(amide-imide) of Example 10 was about 3,000 cps. Subsequently, the solution containing the poly(amide-imide) of Example 10 was diluted with a diluent DMAc to form a diluted solution containing the poly(amide-imide) of Example 10, wherein the diluted solution had a viscosity of about 100 cps. Thereafter, 2 liters (or an excess amount) of non-solvent methanol was added to the diluted solution to precipitate the poly(amide-imide) of Example 10. It is worth noting that the precipitated poly (amide-imide) of Example 10 is subjected to filtering and drying steps for subsequent use.

Example 11

First, 100 parts by weight of polyimide (manufactured by Sabic, trade name: ULTEM 1010 PEI) was dissolved in a solvent DMAc to form a 25 wt % polyimide solution. Next, 2 parts by weight of a modifier isopropylamine was added to the polyimide solution, and the reaction of the modifier isopropylamine and the polyimide was carried out at 80° C. for 6 hours to form a solution containing the poly(amide-imide) of Example 11. The molar ratio of the polyimide to the modifier isopropylamine was 1:16.2, and a viscosity of the solution containing the poly(amide-imide) of Example 11 was about 4,410 cps. Subsequently, the solution containing the poly(amide-imide) of Example 11 was diluted with a diluent DMAc to form a diluted solution containing the poly(amide-imide) of Example 11, wherein a viscosity of the diluted solution was about 100 cps. Thereafter, 2 liters (or an excess amount) of non-solvent methanol was added to the diluted solution to precipitate the poly(amide-imide) of Example 11. It is worth noting that the precipitated poly (amide-imide) of Example 11 is subjected to filtering and drying steps for subsequent use.

Example 12

First, 100 parts by weight of polyimide (manufactured by Sabic, trade name: ULTEM 1010 PEI) was dissolved in a solvent DMAc to form a 25 wt % polyimide solution. Next, 5 parts by weight of a modifier isopropylamine was added to the polyimide solution, and the reaction of the modifier isopropylamine and the polyimide was carried out at 80° C. for 6 hours to form a solution containing the poly(amide-imide) of Example 12. The molar ratio of the polyimide to the modifier isopropylamine was 1:40.6, and a viscosity of the solution containing the poly(amide-imide) of Example 12 was about 3,500 cps. Subsequently, the solution containing the poly(amide-imide) of Example 12 was diluted with a diluent DMAc to form a diluted solution containing the poly(amide-imide) of Example 12, wherein a viscosity of the diluted solution was about 100 cps. Thereafter, 2 liters (or an excess amount) of non-solvent methanol was added to the diluted solution to precipitate the poly(amide-imide) of Example 12. It is noteworthy that the precipitated poly (amide-imide) of Example 12 is subjected to filtering and drying steps for subsequent use.

Example 13

First, 100 parts by weight of polyimide (manufactured by Sabic, trade name: ULTEM 1010 PEI) was dissolved in a solvent DMAc to form a 25 wt % polyimide solution. Next, 1 part by weight of a modifier octadecylamine was added to the polyimide solution, and the reaction of the modifier octadecylamine and the polyimide was carried out at 80° C. for 6 hours to form a solution containing the poly(amide-imide) of Example 13. The molar ratio of the polyimide to the modifier octadecylamine was 1:1.8, and the solution containing the poly(amide-imide) of Example 13 had a viscosity of about 9,000 cps. Next, the solution containing the poly(amide-imide) of Example 13 was diluted with a diluent DMAc to form a diluted solution containing the poly(amide-imide) of Example 13, wherein a viscosity of the diluted solution was about 100 cps. Thereafter, 2 liters (or an excess amount) of non-solvent methanol was added to the diluted solution to precipitate the poly(amide-imide) of Example 13. It is noteworthy that the precipitated poly (amide-imide) of Example 13 is subjected to filtering and drying steps for subsequent use.

Example 14

First, 100 parts by weight of polyimide (manufactured by Sabic, trade name: ULTEM 1010 PEI) was dissolved in a solvent DMAc to form a 25 wt % polyimide solution. Next, 2 parts by weight of a modifier octadecylamine was added to the polyimide solution, and the reaction was carried out at 80° C. for 6 hours to form a solution containing the poly(amide-imide) of Example 14. The molar ratio of the polyimide to the modifier octadecylamine was 1:3.6, and a viscosity of the solution containing the poly(amide-imide) of Example 14 was about 7,100 cps. Subsequently, the solution containing the poly(amide-imide) of Example 14 was diluted with a diluent DMAc to form a diluted solution containing the poly(amide-imide) of Example 14, wherein a viscosity of the diluted solution was about 100 cps. Thereafter, 2 liters (or an excess amount) of non-solvent methanol was added to the diluted solution to precipitate the poly (amide-imide) of Example 14. It is noteworthy that the precipitated poly(amide-imide) of Example 14 is subjected to filtering and drying steps for subsequent use.

Comparative Example 1

In Comparative Example 1, no modifier was used to modify polyimide (manufactured by Sabic, trade name: ULTEM 1010 PEI). That is, the polyimide of commercially available ULTEM 1010 PEI is directly used in Comparative Example 1.

Thereafter, measurements of the glass transition temperature (Tg), the 10% thermogravimetric loss temperature ($T_{d10\%}$), the viscosity ($\eta_{inh}$), the melt flow index (MI) and contact angles of the poly(amide-imide)s of Examples 1-14 and the ULTEM 1010 PEI of Comparative Example 1 were respectively performed. The description of the aforementioned measurements is made as follows, and the measurement results are shown in Table 1.

<Measurement of Glass Transition Temperature (Tg)>

The glass transition temperatures (° C.) of the poly (amide-imide)s of Examples 1-14 and the ULTEM 1010 PEI of Comparative Example 1 were measured under a nitrogen atmosphere and a heating rate of 10° C./min by a thermo-mechanical analyzer (manufactured by Maia Co., Ltd., model: DSC200 F3).

<Measurement of 10% Thermogravimetric Loss Temperature ($T_{d10\%}$)>

The weight changes of the poly(amide-imide)s of Examples 1-14 and the ULTEM 1010 PEI of Comparative Example 1 were respectively measured and recorded under a nitrogen atmosphere and a heating rate of 20° C./min by a thermogravimetric analyzer (manufactured by TA Instruments, Model: Q50). The temperature measured for each one of the poly(amide-imide)s and ULTEM 1010 PEI at a weight loss of 10% is the 10% thermogravimetric loss temperature (° C.).

<Measurement of Viscosity ($\eta_{inh}$)>

The poly(amide-imide)s of Examples 1-14 and the ULTEM 1010 PEI of Comparative Example 1 were respectively dissolved in a solvent DMAc to form a solution having a concentration of 0.5 g/dL, and the viscosity (dL/g) of each solution was measured at a temperature of 30° C.

<Measurement of Melt Flow Index (MI)>

The melt flow indexes (g/10 min) of the poly(amide-imide)s of Examples 1-14 and the ULTEM 1010 PEI of Comparative Example 1 were measured according to the specifications of ASTM D-1238, and the loaded weight was 5 Kg. The test temperature varies depending on the test sample used. For detailed test temperatures, please refer to Table 1. In general, the higher the melt flow index is, the better melt processability is.

<Measurement of Contact Angle>

Water was dropped on the poly(amide-imide)s of Examples 1-14 and the ULTEM 1010 PEI of Comparative Example 1. After water was no longer flowing, the contact angle (degree) between water and each one of the poly (amide-imide)s and ULTEM 1010 PEI was measured using a contact angle measuring device (Model: Model TK-C1380U, manufactured by JVC Corporation).

TABLE 1

| | Tg (° C.) | $T_{d10\%}$ (° C.) | $\eta_{inh}$ (dL/g) | MI (g/10 min)/ test temperature (° C.) | contact angle (degree) |
|---|---|---|---|---|---|
| Example 1 | 212 | 510 | 0.281 | 68/325 | 71 |
| Example 2 | 199 | 501 | 0.310 | 71/295 | 70 |
| Example 3 | 193 | 505 | 0.294 | 66/277 | 67 |
| Example 4 | 155 | 493 | 0.291 | 56/240 | 65 |
| Example 5 | 206 | 503 | 0.312 | 61/310 | 72 |
| Example 6 | 188 | 488 | 0.304 | 55/300 | 70 |
| Example 7 | 160 | 458 | 0.301 | 57/240 | 66 |
| Example 8 | 199 | 501 | 0.312 | 82/287 | 71 |
| Example 9 | 186 | 493 | 0.294 | 58/257 | 70 |
| Example 10 | 149 | 478 | 0.291 | 80/240 | 68 |
| Example 11 | 202 | 506 | 0.309 | 63/317 | 67 |
| Example 12 | 180 | 471 | 0.298 | 59/295 | 65 |
| Example 13 | 210 | 500 | 0.303 | 8/320 | 67 |
| Example 14 | 200 | 482 | 0.294 | 60/300 | 66 |
| Comparative Example 1 | 214 | 528 | 0.314 | 13/337 | 92 |

As can be seen from the above Table 1, the poly(amide-imide)s of Examples 1-14 and the ULTEM 1010 PEI of Comparative Example 1 had similar glass transition temperatures and similar 10% thermogravimetric loss temperatures. The results show that the poly(amide-imide)s of Examples 1-14 and the unmodified polyimide had similar thermal properties, wherein the poly(amide-imide)s are represented by the above formula (1) and obtained by modifying the polyimide represented by the above formula (I) by the modifier represented by the above formula (II).

As apparent from the Table 1 above, the poly(amide-imide)s of Examples 1-14 and the ULTEM 1010 PEI of Comparative Example 1 had similar viscosities. This result shows that the modification process with the modifier represented by the above formula (II) does not influence the polymerization degree of the product, i.e. the poly(amide-imide) represented by the above formula (1).

As can be seen from Table 1 above, comparing with the melt flow index and melt processing temperature of the unmodified ULTEM 1010 PEI of Comparative Example 1, the poly(amide-imide)s of Examples 1-14 have better melt processability at a lower melt processing temperature. This result shows that the poly(amide-imide) represented by the above formula (1) obtained by modifying the polyimide represented by the above formula (I) by the modifier represented by the above formula (II) of this invention has good melt processability by reduced melt processing temperature.

As can be seen from the above Table 1, the poly(amide-imide)s of Examples 1-14 had a lower contact angle than the contact angle of the unmodified ULTEM 1010 PEI of Comparative Example 1. This result shows that the poly (amide-imide) represented by formula (1) obtained by using the modifier represented by the above formula (II) to modify the polyimide represented by the above formula (I) was more hydrophilic, comparing with the unmodified polyimide.

Although this invention has been disclosed in the above examples, it is not intended to limit the invention, and those skilled in the art can make some modifications and refinements without departing from the spirit and scope of the invention. The scope of the invention is defined by the scope of the appended claims.

What is claimed is:

1. A preparation method of a poly(amide-imide), comprising:
forming a first solution containing a poly(amide-imide) by reacting a modifier with a polyimide dissolved in a solvent, wherein the polyimide comprises a repeat unit represented by formula (I), the modifier is represented by formula (II), and the poly(amide-imide) is represented by formula (1)

wherein a weight-average molecular weight of the polyimide is between 44,000 g/mol and 50,000 g/mol,
R is a $C_6$ aryl group, a $C_7$-$C_8$ aralkyl group, a $C_2$-$C_6$ alkoxyalkyl group, or a $C_3$-$C_{18}$ alkyl group, and
0.02≤X≤0.5; and
precipitating the poly(amide-imide) from the first solution by adding a non-solvent into the first solution containing the poly(amide-imide).

2. The method of claim 1, wherein R is selected from the functional groups represented by formula (a) to formula (g) shown below, and * represents a bonding position in formula (a) to formula (g).

3. The method of claim 1, wherein a weight-average molecular weight of the poly(amide-imide) is between 47,000 g/mol and 55,000 g/mol.

4. The method of claim 1, wherein the solvent comprises N,N-dimethylacetamide (DMAc), N-methyl-2-pyrrolidone (NMP) or tetrahydrofuran (THF).

5. The method of claim 1, wherein the non-solvent comprises methanol, ethanol, isopropanol, or water.

6. The method of claim 1, further comprising using a diluent to dilute the first solution containing the poly(amide-imide) to form a second solution containing the poly(amide-imide) before adding the non-solvent to the first solution containing the poly(amide-imide).

7. The method of claim 6, wherein a viscosity of the first solution containing the poly(amide-imide) is between 1,000 cps and 10,000 cps, and a viscosity of the second solution containing the poly(amide-imide) is between 10 cps and 200 cps.

8. The method of claim 1, wherein a ratio of the weight-average molecular weight of the poly(amide-imide) and the weight-average molecular weight of the polyimide is between 2.2 and 2.6.

9. The method of claim 1, wherein a reaction temperature of a reaction between the polyimide and the modifier is between 30° C. and 100° C.

\* \* \* \* \*